(12) United States Patent
Shotton et al.

(10) Patent No.: US 12,257,120 B2
(45) Date of Patent: Mar. 25, 2025

(54) MULTI PORT IRRIGATION NEEDLE

(71) Applicant: DENTSPLY SIRONA Inc., York, PA (US)

(72) Inventors: Vincent W. Shotton, Broken Arrow, OK (US); Kevin L. Wilkinson, Bixby, OK (US)

(73) Assignee: Dentsply Sirona Inc., York, PA (US)

( * ) Notice: Subject to any disclaimer, the term of this patent is extended or adjusted under 35 U.S.C. 154(b) by 682 days.

(21) Appl. No.: 16/427,960

(22) Filed: May 31, 2019

(65) Prior Publication Data

US 2019/0365504 A1    Dec. 5, 2019

Related U.S. Application Data

(60) Provisional application No. 62/679,064, filed on Jun. 1, 2018.

(51) Int. Cl.
*A61C 5/40* (2017.01)
*A61C 5/50* (2017.01)
*A61C 17/02* (2006.01)

(52) U.S. Cl.
CPC ............. *A61C 5/40* (2017.02); *A61C 5/50* (2017.02); *A61C 17/0208* (2013.01)

(58) Field of Classification Search
CPC ......... A61C 5/40; A61C 5/50; A61C 17/0208; A61M 5/3291; A61M 25/007; A61M 25/0015
USPC ............................................................. 433/81
See application file for complete search history.

(56) References Cited

U.S. PATENT DOCUMENTS

| 4,135,302 | A | * | 1/1979 | Kronman | A61C 5/40 433/102 |
| 4,276,880 | A | * | 7/1981 | Malmin | A61C 17/0208 433/80 |
| 5,490,779 | A | * | 2/1996 | Malmin | A61C 5/40 433/81 |
| 5,601,539 | A | * | 2/1997 | Corso, Jr. | A61M 25/0043 604/524 |
| 6,079,979 | A | * | 6/2000 | Riitano | A61C 5/40 433/81 |

(Continued)

FOREIGN PATENT DOCUMENTS

| EP | 0290011 B1 | 7/1993 |
| WO | 200193773 A2 | 12/2001 |

(Continued)

OTHER PUBLICATIONS

International Search Report; PCT/US2019/034875; Aug. 13, 2019 (completed); Aug. 27, 2019 (mailed).

(Continued)

*Primary Examiner* — Heidi M Eide
*Assistant Examiner* — Holly T. To
(74) *Attorney, Agent, or Firm* — SCHWEGMAN LUNDBERG & WOESSNER, P.A.

(57) ABSTRACT

A needle comprising a luer lock connection, an internal fluid delivery conduit, exit ports and an outer profile shaped to match a geometry created by a previous canal shaping instrument. A shape of the needle and features of the exit ports are configured to maximize the amount of shear wall stress and debridement created along the wall of a root canal to be irrigated.

12 Claims, 17 Drawing Sheets

(56) References Cited

U.S. PATENT DOCUMENTS

| | | | | |
|---|---|---|---|---|
| 6,162,202 | A * | 12/2000 | Sicurelli | A61C 5/40 604/525 |
| 6,494,713 | B1 * | 12/2002 | Pond | A61C 5/40 433/81 |
| 6,997,714 | B1 * | 2/2006 | Schoeffel | A61C 5/40 433/81 |
| 2002/0095124 | A1 * | 7/2002 | Palasis | A61B 17/32037 604/272 |
| 2005/0287498 | A1 * | 12/2005 | Schoeffel | A61C 17/0208 433/81 |
| 2009/0004621 | A1 | 1/2009 | Quan | |
| 2009/0130622 | A1 * | 5/2009 | Bollinger | A61C 1/0046 433/29 |
| 2010/0028830 | A1 * | 2/2010 | Hof | A61C 5/40 433/81 |
| 2010/0092922 | A1 * | 4/2010 | Ruddle | A61C 5/40 433/216 |
| 2011/0111365 | A1 * | 5/2011 | Gharib | A61C 17/024 433/81 |
| 2012/0016348 | A1 * | 1/2012 | Hansen | A61M 1/84 604/541 |
| 2012/0148979 | A1 * | 6/2012 | Ruddle | A61C 5/40 433/119 |
| 2013/0253448 | A1 * | 9/2013 | Baron | A61M 5/3291 604/272 |
| 2013/0276497 | A1 | 10/2013 | Ingvarsson | |
| 2015/0157432 | A1 * | 6/2015 | Tilse | A61C 5/40 433/81 |
| 2017/0007776 | A1 * | 1/2017 | Sahin | A61M 5/3286 |
| 2017/0071710 | A1 * | 3/2017 | Deturmeny | A61C 17/02 |
| 2018/0214247 | A1 * | 8/2018 | Sharma | A61C 5/50 |
| 2019/0223982 | A1 * | 7/2019 | Li | A61C 5/50 |
| 2020/0268491 | A1 * | 8/2020 | Shotton | A61C 17/0208 |
| 2023/0355894 | A1 * | 11/2023 | Gowda | A61M 5/3291 |
| 2023/0363853 | A1 * | 11/2023 | Spironelli Ramos | A61C 17/0202 |
| 2024/0293199 | A1 * | 9/2024 | Shivappa | A61C 5/50 |

FOREIGN PATENT DOCUMENTS

| | | |
|---|---|---|
| WO | 20140060985 A2 | 4/2014 |
| WO | 2014099064 A1 | 6/2014 |

OTHER PUBLICATIONS

Written Opinion of the International Searching Authority; PCT/US2019/034875; Aug. 13, 2019 (completed); Aug. 27, 2019 (mailed).

International Preliminary Report on Patentability; PCT/US2019/034875; Aug. 13, 2019 (completed); Aug. 27, 2019 (mailed).

* cited by examiner

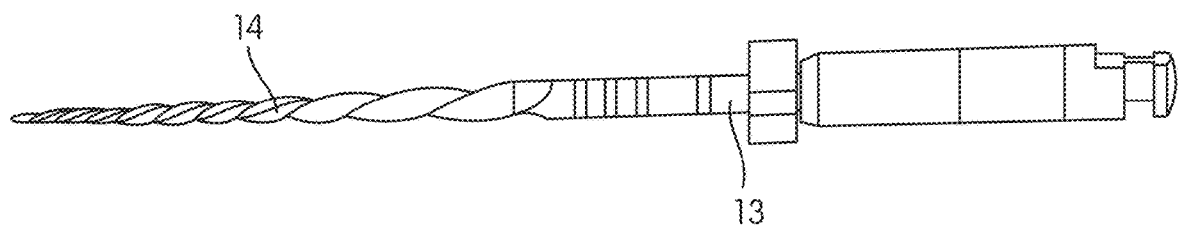
FIG. 5 A
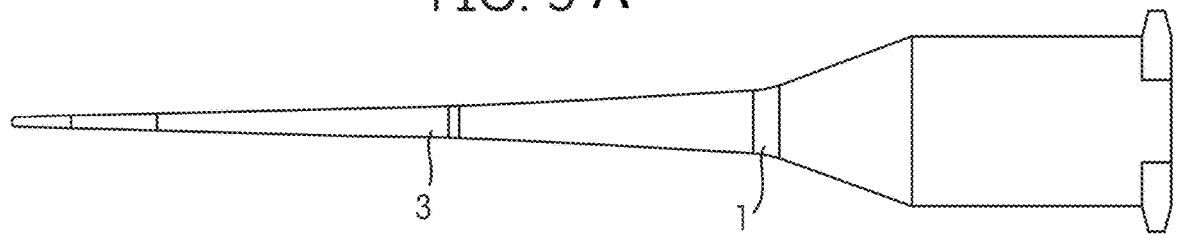
FIG. 5 B
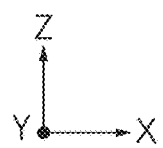

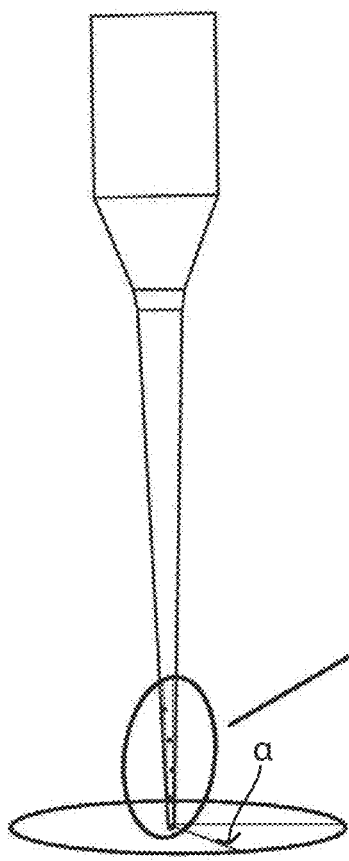
FIG. 6 A
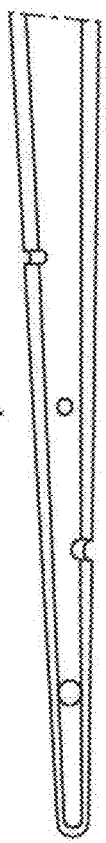
FIG. 6 B
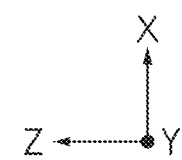

Traditional Irrigation Needle
New Irrigation Needle
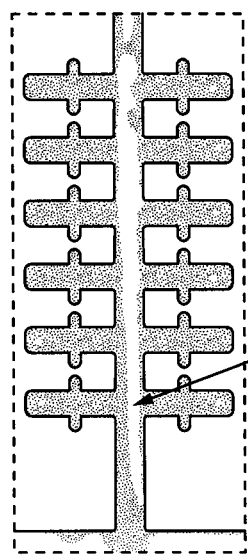
Coronal Section is much cleaner on New Irrigation Needle than Traditional Irrigation Needle
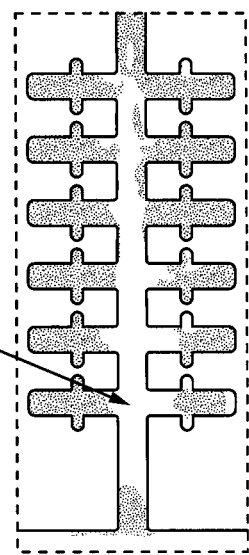
FIG. 19A
FIG. 19B

MULTI PORT IRRIGATION NEEDLE

CROSS-REFERENCE TO RELATED APPLICATIONS

This patent application claims the benefit of and priority to U.S. Provisional Application No. 62/679,064 filed Jun. 1, 2018, which is herein incorporated by reference for all purposes.

FIELD OF THE INVENTION

The present application relates generally to an endodontic needle for endodontic treatment, and, more particularly, to a multiport endodontic irrigation needle.

BACKGROUND OF THE INVENTION

Endodontic treatment is important when pulp, which is the soft tissue inside a root canal, becomes inflamed or infected. The inflammation or infection can be caused by deep decay, repeated dental procedures on the tooth or a crack or chip in the tooth. If pulp inflammation or infection is left untreated, it can cause pain or lead to an abscess. Root canal files used to remove pulp from root canals and files may vary in tip diameter and taper increase.

A dentist normally starts with the smaller size and gradually increases file diameter in order to create the shape needed for proper irrigation in cleaning the root canal and obturation to optimally seal the root canal.

Irrigation needles are used with irrigant to remove chips of dentine and residual organic matter in the process of root canal reformation during endodontic treatment. An irrigation needle is engaged to a syringe containing a disinfection solution, the tip of the needle is applied to the irrigation site and the disinfection solution is spouted or extruded from the tip.

Traditionally, irrigation needles have been produced using stainless steel tubing molded or glued into a plastic luer lock connector. The stainless steel tubing is open or close ended with 1 or more side exit ports for the spouting of irrigant within the root canal. Patents such as EP Patent No. 0,290, 011B1, U.S. Pat. No. 6,079,979A, U.S. Pat. No. 6,162,202A, and U.S. Pat. No. 6,494,713B1 show this type of design. The designs have vents for an irrigant to be spouted from the needle.

A problem, however, with these conventional designs is that the relative location of where the irrigant is being spouted from the exit port in the needle with respect to where the canal wall is located is large and thus the irrigant does not have enough velocity or pressure to create enough shear wall stress to penetrate into the lateral canals and irregular anatomy of the root canal to adequately clean it.

Other needles, such as are shown in US Patent Application No. US20170071710A1, and U.S. Pat. No. 5,490,779 have attempted to address this issue by having a different design or having multiple ports such as in WO2014060985A2 and EP Patent No. 0290011B1. However, these disclosures have not been able to show how dimensions of the exit ports affects the outlet irrigation pressure and velocity as well as how to optimize these area openings to achieve a balanced and maximized pressure and velocity of the irrigant being spouted.

SUMMARY OF THE INVENTION

Existing limitations associated with the foregoing, as well as other limitations, may be overcome by an endodontic irrigation needle comprising an attachment portion (e.g., a luer lock connection), an internal fluid delivery conduit, exit ports and an outer profile shaped to match a geometry created by a previous shaping instrument. A shape of the endodontic irrigation needle (hereinafter referred to as needle or irrigation needle or endodontic irrigation needle or multi-port irrigation needle or the like) and dimensions of the exit ports (hereinafter referred to as ports or exit ports or the like) may be configured to have the exit ports as close as possible to the walls of the root canal to balance and maximize the pressure and velocity of the irrigant being spouted in order to maximize the amount of shear wall stress and debridement created along the walls of a root canal and lateral canals. Herein, an outer profile of the needle may be shaped to match a geometry created by a previous shaping instrument.

According to an exemplary embodiment herein, a needle is provided wherein the size, position, number, and shape of the exit ports as well as the shape of the internal fluid delivery conduit and needle may be designed to increase the velocity and pressure of the irrigant being used for irrigation. In an embodiment herein, the design may be such that the pressure and velocity of fluids being ejected from all exit ports are substantially the same.

According to another exemplary embodiment, the needle may have between two to four, or more exit ports for irrigation. Moreover, the needle may have two ports wherein one port may be located about 1.5-3 mm (e.g., 2 mm) from the tip of the needle in an apical section of the needle and the other port may be located 4-6 mm from the tip of the needle in a coronal/mid-root section of the needle.

In yet another embodiment, the needle may have an outer profile constructed such that the exit port locations of the needle are as close as possible to the canal walls. Herein the outer profile may be constructed to match or substantially match the shape of a shaping instrument to be used in shaping the root canal before irrigation. In doing so, an exit velocity and/or pressure of the irrigant exiting the exit ports of the needle may be maximized and the distances between the exit ports and the walls of the canal may be minimized in order to provide adequate shear wall stress in the cleaning and removing of debris within the root canal and lateral canals.

In another exemplary embodiment herein, a geometry of the internal fluid delivery conduit within the needle may also be configured to be tapered (for example between 0% 10% (e.g., 0.5% to 8% taper) wherein taper percentages may be based on rate of growth in diameter).

In an embodiment, the shape of the needle and internal fluid delivery conduit and features of the exit ports such as shape, size, number, and location may be configured such that a predetermined direction and/or pressured and velocity of the irrigant being spouted may be achieved. For example, exit ports located near the apical section of the needle may be elongated and exit ports located near the coronal/mid root section of the needle may be less elongated or circular in order to control the direction of ejection of the spouted irrigants such that the direction of ejection is perpendicular or substantially perpendicular to a longitudinal axis x of the needle. Herein if the internal cavity size is large at a first location on the needle, a small or less elongated exit port size may be needed to maintain the same pressure and velocity of fluids exiting a large sized exit port at a location where the internal cavity size is small.

In yet another exemplary embodiment, the needle may be configured to hold a sealer to be ejected out of the exit ports onto and along the walls of a root canal.

Other objects and advantages of the various embodiments of the present invention will become obvious to the reader and it is intended that these objects and advantages are within the scope of the present disclosure. To the accomplishment of the above and related embodiments, this invention may be embodied in the form illustrated in the accompanying drawings, attention being called to the fact, however, that the drawings are illustrative only, and that changes may be made in the specific construction illustrated and described within the scope of this application.

Further features and advantages, as well as the structure and operation of various embodiments herein, are described in detail below with reference to the accompanying drawings.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein and wherein:

FIGS. 5A and 5B illustrate a side-by-side comparison of an irrigation needle and a corresponding shaping instrument;

FIGS. 6A and 6B show another embodiment of the present invention which provides a needle having four exit ports, with each port having a predetermined size, location and shape to spout irrigants in a predetermined manner;

FIG. 19A shows an exemplary cleaning using a traditional Irrigation needle; and FIG. 19B shows an exemplary cleaning using an Irrigation needle of the present invention.

Figure 1:
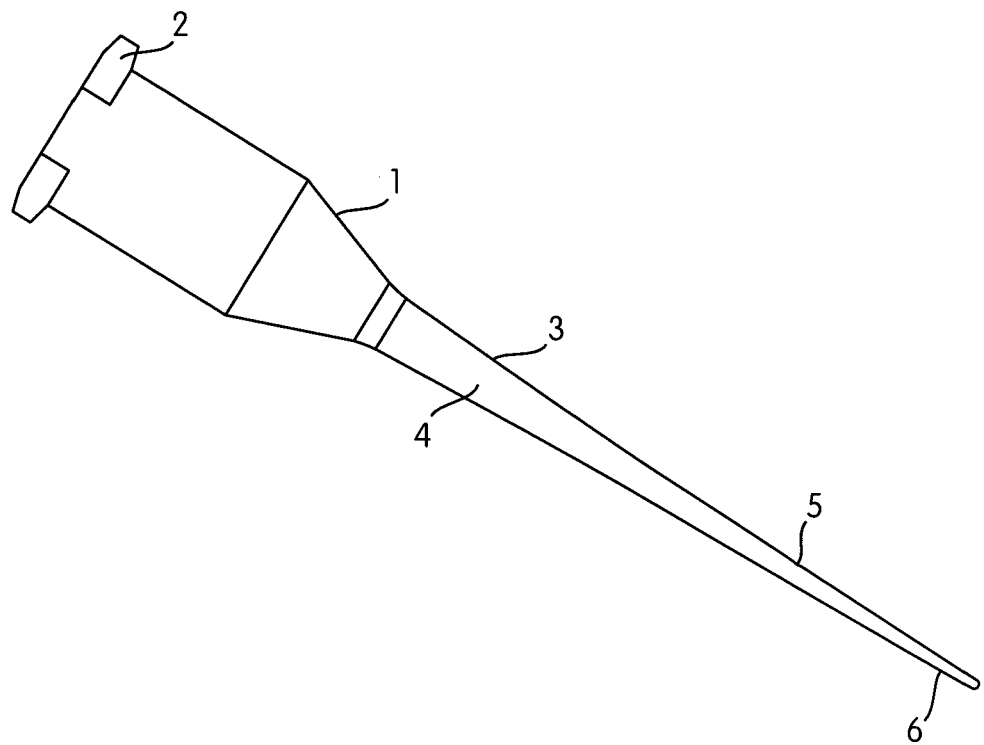
FIG. 1 illustrates a perspective view of an embodiment according to the present disclosure.

Different ones of the Figures may have at least some reference numerals that are the same in order to identify the same components, although a detailed description of each such component may not be provided below with respect to each Figure.

DETAILED DESCRIPTION OF THE INVENTION

In accordance with example aspects described herein a device may be provided for irrigating a root canal 16 such that an amount of shear wall stress and debridement created along the wall of a root canal 16 being irrigated is maximized. In irrigating a shaped root canal 12 (FIG. 3), areas of the canal that a shaping instrument could not reach as well as residual debris from the canal 16 caused by the shaping instrument are cleaned. Generally, a root canal 16 is anatomically complex and is not perfectly circular in cross-section. Specifically, the root canal 16 is typically more irregular in shape in the coronal aspect and becomes smaller and more circular in cross-section as the canal 16 advances apically. Therefore, a majority of the canal 16 is shaped apically and less shaped coronally by a shaping instrument.

The root canal 16 may further include dentinal tubules or lateral canals 17 with circular or substantially circular openings where the debris can become lodged into. Desirably, it may be ideal to have the dentinal tubules opened and cleaned as much as possible to remove any bacteria that may be trapped in them prior to obturation.

FIG. 1 illustrates an embodiment of the irrigation needle 1 comprising a and attachment/connection 2 such as a luer lock connection, an internal fluid delivery conduit 4, a coronal/mid-root exit port 5 and an apical exit port 6. Herein, the needle may have an outer profile 3 shaped to match a geometry created by a previous shaping instrument 13 (FIG. 5) used for shaping the canal 16.

A syringe (not shown) may be attached to the irrigation needle 1 through the luer lock connection 2. When the syringe may be filled with an irrigation fluid/irrigant such as NaOCl, Ethylenediaminetetraacetic acid (EDTA), or other fluids used to digest the tissue and flush the canal 16 and pressure is applied to a plunger of the syringe, the irrigation fluid may be delivered through the needle via the internal fluid delivery conduit 4 and through the coronal/mid-root exit port 5 and the apical exit Port 6.

Figure 2:
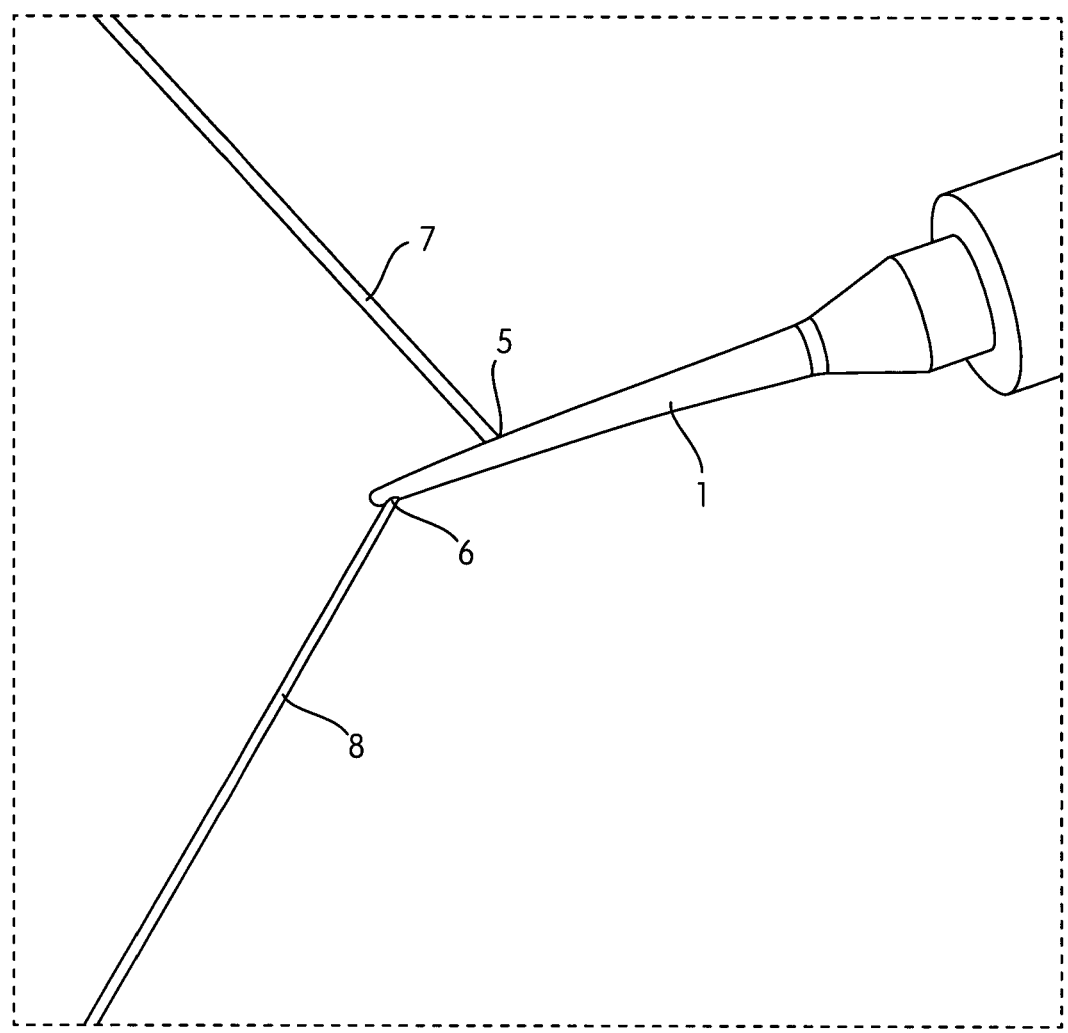
FIG. 2 shows another embodiment of the present invention with the irrigant being spouted from the exit ports.

As seen in FIG. 2, which shows irrigation fluid/irrigant 7, 8 being expelled from the irrigation needle 1, the apical irrigant 8 may be expelled from the apical exit port 6 and the coronal/mid-root irrigant 7 may be expelled from the coronal/mid-root exit port 5. In an embodiment herein, the shape, dimensions and other features such as location and total number of the exit ports are such that the irrigant may be expelled at one or more predetermined angles that are, for example, perpendicular or substantially perpendicular to an axis x of the irrigation needle 1. Specifically, a geometry of the internal fluid delivery conduit 4 within the needle 1 may be configured to be tapered such that it may have a smaller internal cavity size at an apical portion/section/end of the needle 9 than at a coronal portion/section/end of the needle 11 or mid-root portion/section/end of the needle 10. Herein exit ports closest to an apical end of the needle may have a larger opening than exit ports located in the coronal portion 11 and mid-root portion 10 of the needle 1 such that a balanced and maximized pressure and velocity of fluids exiting the ports is achieved.

In an embodiment herein, the shape of the needle and internal fluid delivery conduit and dimensions of the exit ports may be configured such that the same or substantially the same pressure and velocity of irrigants being spouted from the exit ports is achieved. For example, exit ports located near the apical section 9 of the needle may be elongated due to the tapered internal fluid conduit 4 having a smaller volume at the apical section 9 than at the coronal section 11 or mid-root section 10. Exit ports located near the coronal/mid root section of the needle may be less elongated or more circular due to the tapered internal fluid conduit 4 having a bigger volume at the coronal portion 11 or mid-root portion 10 than at the apical end 9. This may allow irrigants to be spouted from all exit ports at a substantially equal velocity, as explained herein after, and may also lead to the control of the direction of ejection of the spouted irrigants such that the direction of ejection is perpendicular or substantially perpendicular to a longitudinal axis x of the needle when a an amount of pressure is applied to the syringe (not shown) containing the irrigant. Specifically, increasing the area of the exit port at the apical portion 9 may cause a corresponding reduction in the pressure of the irrigant at the apical portion 9, hence providing the irrigant a flow path in the conduit 4 of less resistance at the apical portion 9 of the needle 1 than at the coronal portion 11 or mid-root portion 10 of the needle and therefore producing a balanced or substantially equal pressure and velocity of the exiting irrigants.

Figure 7:
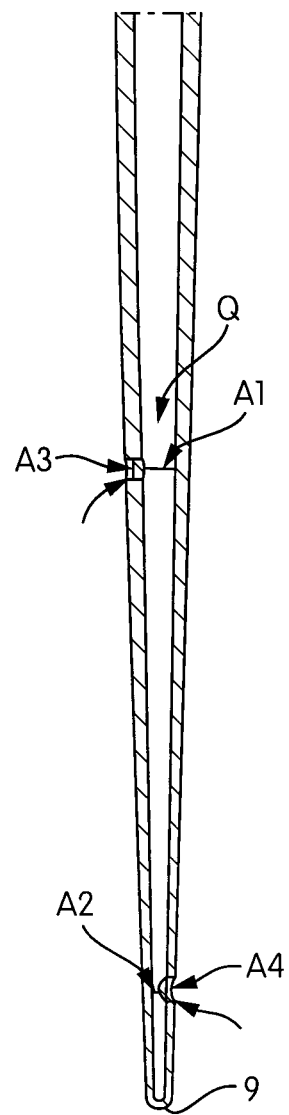
FIG. 7 is a cross sectional view illustrating a relationship between fluid pressures and sizes of the internal fluid delivery conduit.

Further, as explained below in conjunction with areas $A_1$-$A_4$ shown in FIG. 7 where:

$A_1$=the cross-sectional area of the conduit 4 at the Mid-Root Port 5

$A_2$=the cross-sectional area of the conduit 4 at the Apical Port 6

$A_3$=the cross-sectional area of the opening at the Mid-Root Port 5 and $A_4$=the cross-section area of the opening at the Apical Port 6

Volume flow rate is the volume of fluid that may pass through a given cross sectional area per unit time. Volume flow rate Q=A (cross sectional area)*V (speed of fluid in that section).

Let $Q_1$=Flow Rate at cross sectional area $A_1$
Let $Q_2$=Flow Rate at cross sectional area $A_2$
Let $Q_3$=Flow Rate at cross sectional area $A_3$
Let $Q_4$=Flow Rate at cross sectional area $A_4$
Let $V_1$=the velocity of the irrigant at $A_1$.
Let $V_2$=the velocity of the irrigant at $A_2$.
Let $V_3$=the velocity of the irrigant at $A_3$.
Let $V_4$=the velocity of the irrigant at $A_4$.

For Inlet Volume Flow Rate dictated by the syringe plunger pressure $Q_1$, $Q_1=Q_3+Q_4$, $Q_2=Q_1-Q_3$, and $Q_2=Q_4$ for conservation of mass and incompressible fluid flow assuming no losses.

Assuming $A_1=2A_2$, $Q_1=A_1V_1$, $Q_2=A_2V_2$, $Q_3=A_3V_3$, and $Q_4=A_4V_4$ therefore, (i):

$Q_2=Q_1-Q_3$
$A_2V_2=A_1V_1-Q_3$
$Q_3=2A_2V_1-A_2V_2$ (ii):
$Q_1=Q_3+Q_4$
$Q_3=Q_1-Q_4$
$Q_3=A_1V_1-A_4V_4$

For a needle design wherein $V_3$ is desired to be equal to $V_4$, and $A_1=2A_2$, $Q_3=2A_2V_1-A_4V_3$ Substituting $Q_3$ in (i) into (ii):

$2A_2V_1-A_4V_3=2A_2V_1-A_2V_2$
$A_4V_3=A_2V_2$
$A_4/V_2=V_2/V_3$
$V_3=V_4=A_2/A_4*V_2$

The fluid velocity at the ports are proportional to the ratio of Areas $A_2$ and $A_4$ times the fluid velocity of the internal conduit at Port 2 assuming $A_1=2A_2$. In an embodiment herein, $A_2$ may always be greater than $A_4$. For incompressible fluid flow where the density of the fluid may be constant, pressure has an inverse relationship with velocity of the fluid. As the exit area of a port decreases, the pressure at the port increases and the velocity decreases. Therefore, when velocities at the ports are equal or substantially equal, it may be concluded that the pressures at the ports may also be equal or substantially equal.

In can be appreciated by a person of ordinary skill in the art that the same principles can be used to determine a relationship between conduit and port areas as the number and shape of the ports increase. It can also be appreciated that as the inlet flow rate Q is increased, the difference in exit port areas between $A_4$ and $A_3$ may become less important because the velocities are higher. In an exemplary embodiment herein, the apical exit port 6 and the coronal/mid-root exit port 5 may be constructed such that for an irrigant flow rate of, for example, 15 milliliters per minute, (i) the pressure and velocity of the irrigant exiting the corona/mid-root exit port 5 may be about 110 kPa and 2.94 m/s respectively and (ii) the pressure and velocity of the irrigant exiting the apical exit port 6 may be about 100 kPa and 2.88 m/s respectively.

Figure 8:
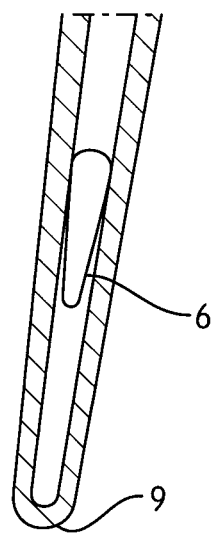
FIG. 8 is a cross sectional view illustrating a first shape of an exit port.
Figure 9:
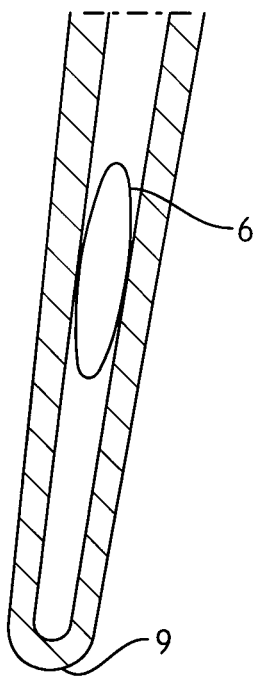
FIG. 9 is a cross sectional view illustrating a second shape of an exit port.
Figure 10:
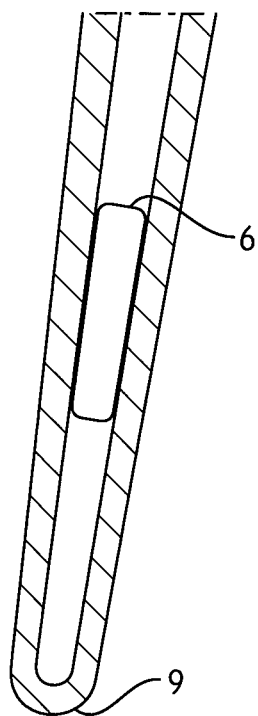
FIG. 10 is a cross sectional view illustrating a third shape of an exit port.
Figure 11:
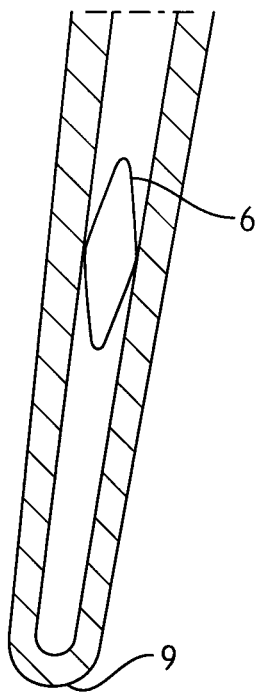
FIG. 11 is a cross sectional view illustrating a fourth shape of an exit port.

Preferably the shape of the internal fluid delivery conduit 4, needle 1 and design of the exit ports may be such that (i) a minimum velocity of the irrigant being spouted at all exit ports is 0.5 m/s and (ii) a minimum pressure of the irrigant being spouted at all exit ports is 50 kPa, In another embodiment, an exit port may be configured such that the irrigant is spouted down the apical end 15 of the root canal 16 rather than perpendicularly to the longitudinal axis x of the needle 1. In yet another embodiment, the shape of an exit port 5, 6 may be elliptical, rectangular, oval or any other shape, as shown in FIGS. 8-11, such that a port cross-sectional area needed for the irrigant to exit the port at that location at a predetermined velocity and/or direction is achieved. FIG. 8 shows an irregularly shaped elongated apical exit port 6 having a small internal cavity at a location of the apical exit port 6. Herein the irrigant may spouted perpendicularly to the longitudinal axis x of the needle 1 due to the elongated or substantially elongated nature of the exit port 6. The size/area of the apical exit port 6 may also be configured according to the flow rate analysis above such that the irrigants may be spouted from all exit ports of the needle 1 at a substantially equal velocity and pressure. Likewise, FIG. 9-11 show elongated oval, rectangular and square apical exit ports 6 respectively.

Figure 3:
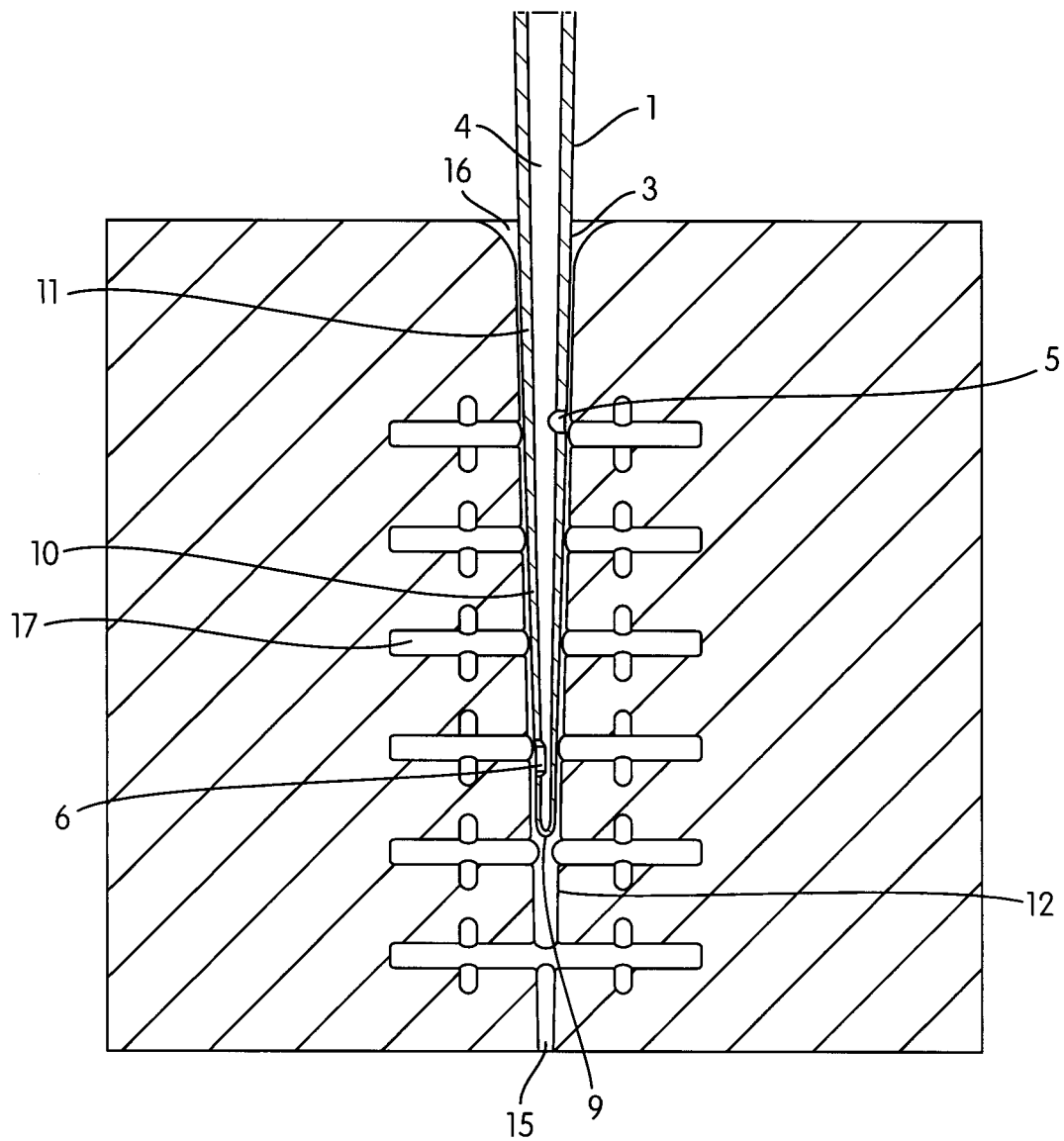
FIG. 3 is a cross sectional view showing a cross section of the needle inside a canal according to at least one embodiment herein.

FIG. 3 shows how such an embodiment would fit in a canal 16 being treated. For irrigation needles 1 having a tapered internal fluid delivery conduit 4, it may be necessary to have exit ports 5, 6 having different sizes of their openings in order to produce the same or predetermined velocity and pressure of fluids at the exit ports based on a minimum amount of pressure exerted by a user on the syringe (not shown).

Figure 4:
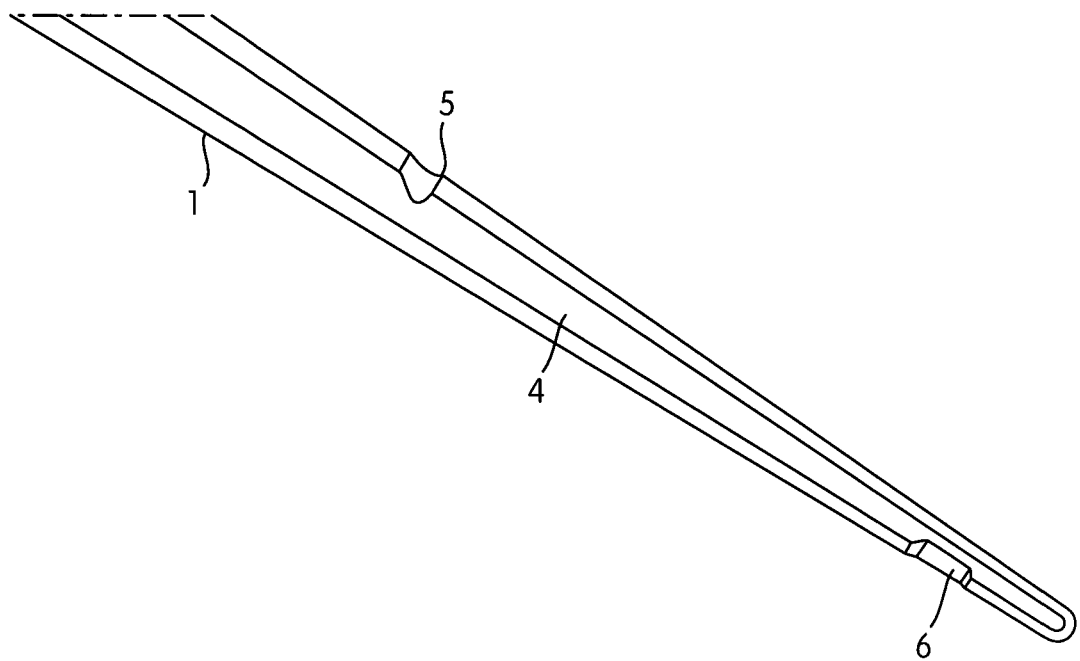
FIG. 4 is a zoomed in cross sectional view showing the exit ports and tapered internal fluid delivery conduit in detail.

FIG. 4 is a cross section showing the exit ports 5, 6 and tapered internal fluid delivery conduit 4 in detail. Irrigation needle 1 may have a tapered internal fluid delivery conduit 4 as a means to delivering irrigant to exit ports coronal/mid-root exit port 5 and apical exit port 6. The coronal/mid-root exit port 5 and apical exit port 6 may have different area of the port openings in order to maximize the velocity and pressure of the irrigant being expressed such that they are balanced or the same at both exit ports. Herein, a predetermined minimum syringe pressure may be required.

In another embodiment herein, the area of the opening of the apical exit port 6 may be larger than the area of the opening of the coronal/mid-root exit port.

The geometry of exit openings may circular, elliptical, rectangular, oval, etc. In order to optimize the opening for that specific location on the irrigation needle 1 the opening of the port at a specific location along the length of the needle is sized not to be larger than the internal needle conduit 4, at that location of the needle.

In another embodiment, the distance between the coronal/mid-root exit port 5 and apical exit port 6 may be more than 3 mm and in yet another embodiment, said distance may be between 4 mm and 8 mm. In another embodiment, there may be only two exit ports 5, 6 and one exit port 5 may be 1.5-3 mm (e.g., 2 mm) from the tip of the needle and a second exit port 6 may be 4-6 mm from the tip.

FIGS. 5A and 5B show a side-by-side comparison of irrigation needle 1 having an outer profile 3 that matches the shape of the shaping instrument 13 and thus the canal shape created by the outer profile 14 of shaping Instrument 13.

FIGS. 6A and 6B show another embodiment of the needle 1 having 4 exit ports, with each port having a different size to direct irrigants in a predetermined manner. In an embodiment, the needle 1 may be used to eject a sealer (not shown) rather than an irrigant, providing a device and a method for delivering sealers to a root canal 16 prior to obturation. The needle 1 may be placed into the canal 16 and then the syringe (not shown) having the sealer may push the sealer into the needle and extrude the sealer of the exit ports to be applied to the canal wall. The clinician may move the needle up and down within the root canal 16 to spread the sealer along the canal walls.

In another embodiment herein, the needle 1 is injection molded using a plastic that is biocompatible and that provides the strength and flexibility required to navigate around curves within the root canal 16. These materials include, but are not limited to: Polyphenylsulfone (PPSU), Polyethylene (PE), Nylon, Polysulfone (PSU) Acetal, and Polyamide, etc.

In yet another embodiment of the present invention the exit ports may be configured to maximize the areas of the root canal 16 walls that may be cleaned by the fluid. Herein the exit ports may be located at a plurality of angular positions a around the longitudinal axis X as shown in FIG. 6 such that the walls or substantially all parts of the walls of the root canal 16 may be cleaned as the needle 1 is moved up and down. In an exemplary embodiment herein, adjacent exit ports may be positioned along a path (not shown) e.g. spiral path extending along the outer profile of the needle and may be angularly displaced from each other by an angle a of for example between 45 and 180 degrees (e.g. 90 degrees).

Figure 12:
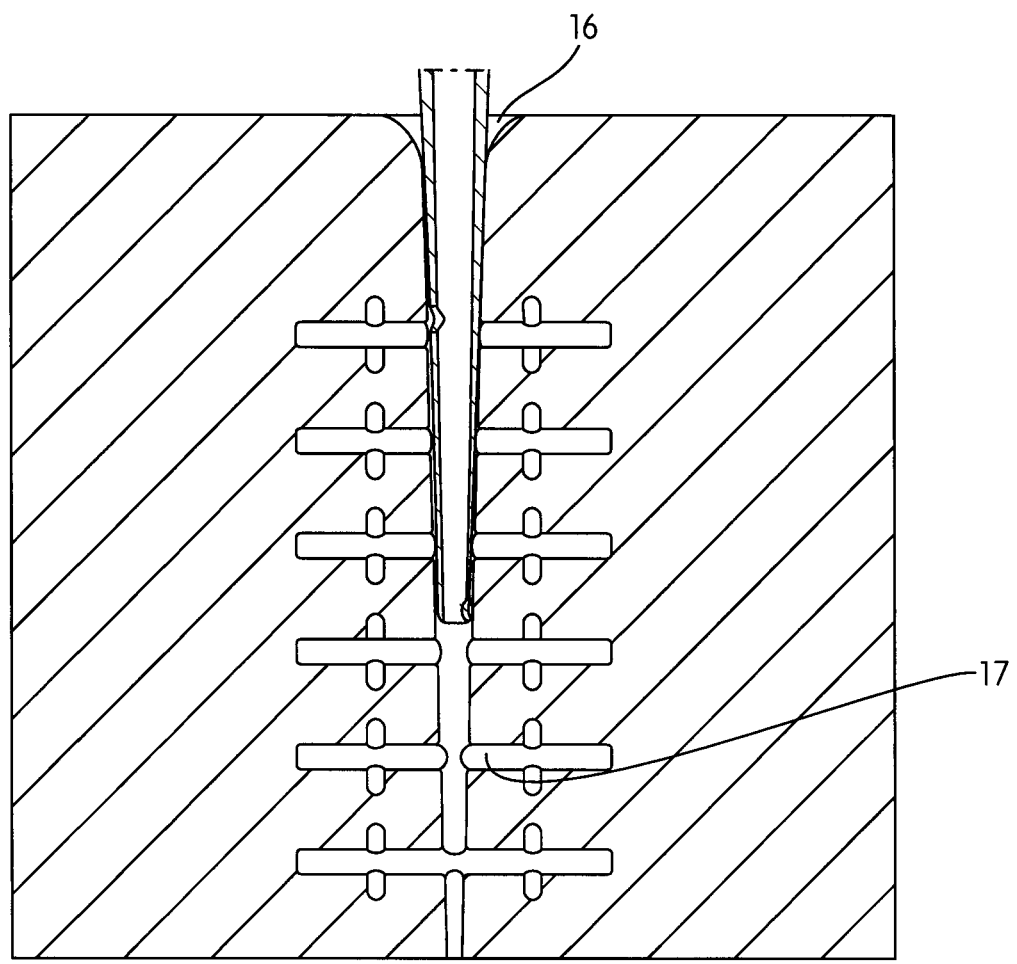
FIG. 12 shows another embodiment of the present invention wherein the exit ports clean only the mid-root and coronal portions of the root canal.
Figure 13:
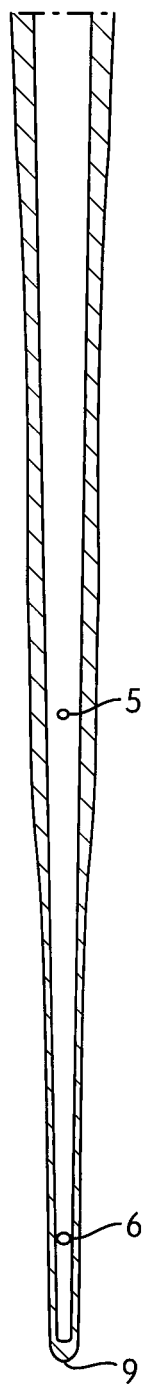
FIG. 13 shows another embodiment of the present invention wherein having walls which may be recessed in to allow easy fluid removal.

In yet another exemplary embodiment as shown in FIG. 12, the needle 1, the length and/or thickness of the needle 1 may be such that the exit ports clean only the mid-root and coronal portions of the root canal 16 but not the apical portion of the root canal 16. In another exemplary embodiment as shown in FIG. 13, an outer profile of the needle 1 may be designed such that walls of the needle 1 at the exit port locations are close to walls of the canal and walls of the needle 1 at locations where there are no exit ports are recessed in to allow for fluid/debris in the canal 16 to be removed easily.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety to the extent allowed by applicable law and regulations. The disclosure may be embodied in other specific forms without departing from the spirit or essential attributes thereof, and it is therefore desired that the present embodiments be considered in all respects as illustrative and not restrictive. Any headings utilized within the description are for convenience only and have no legal or limiting effect.

Figure 14:
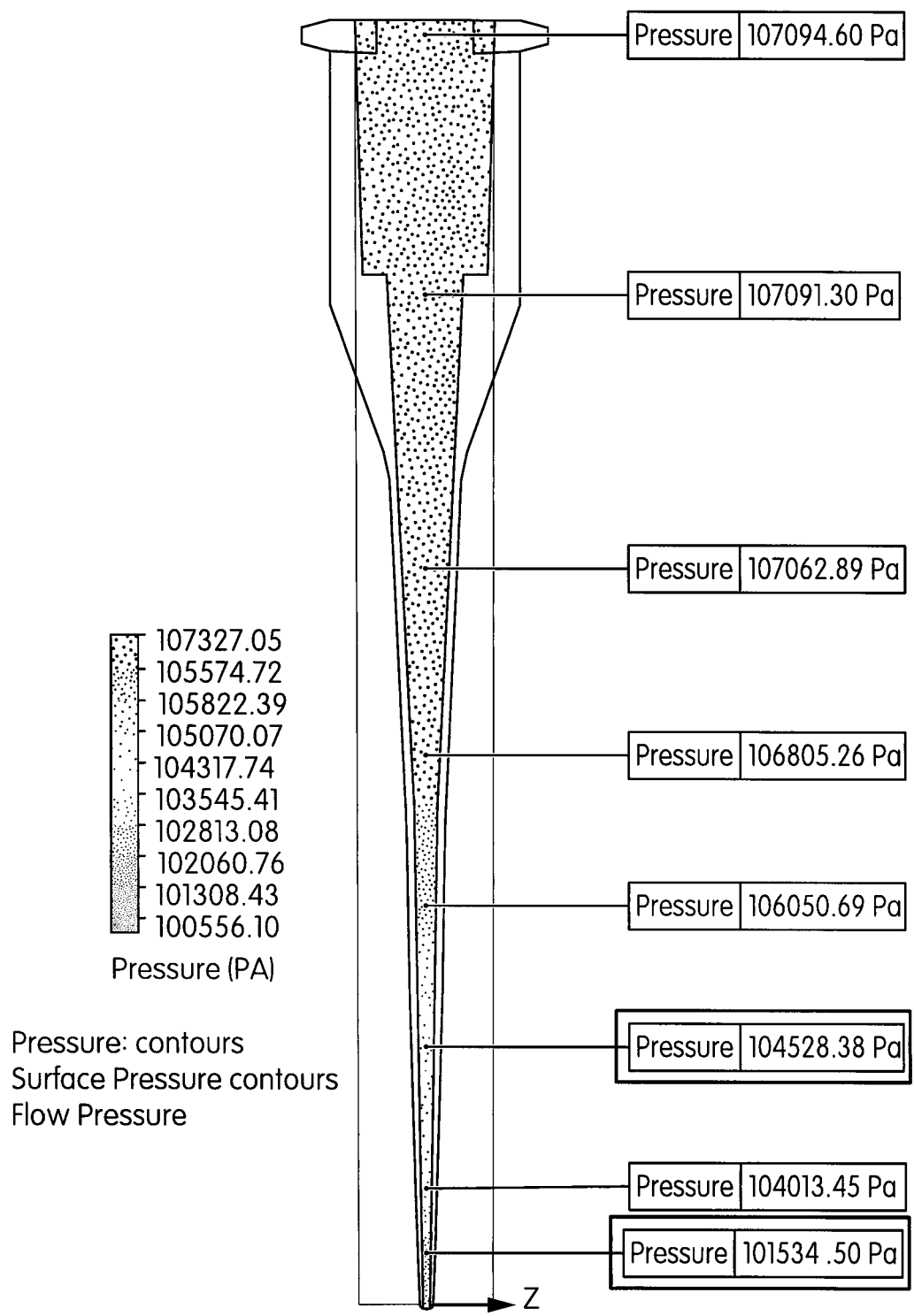
FIG. 14 shows a cross-sectional view of a prior art device with an internal fluid pressure distribution of a non-optimized port size.
Figure 15:
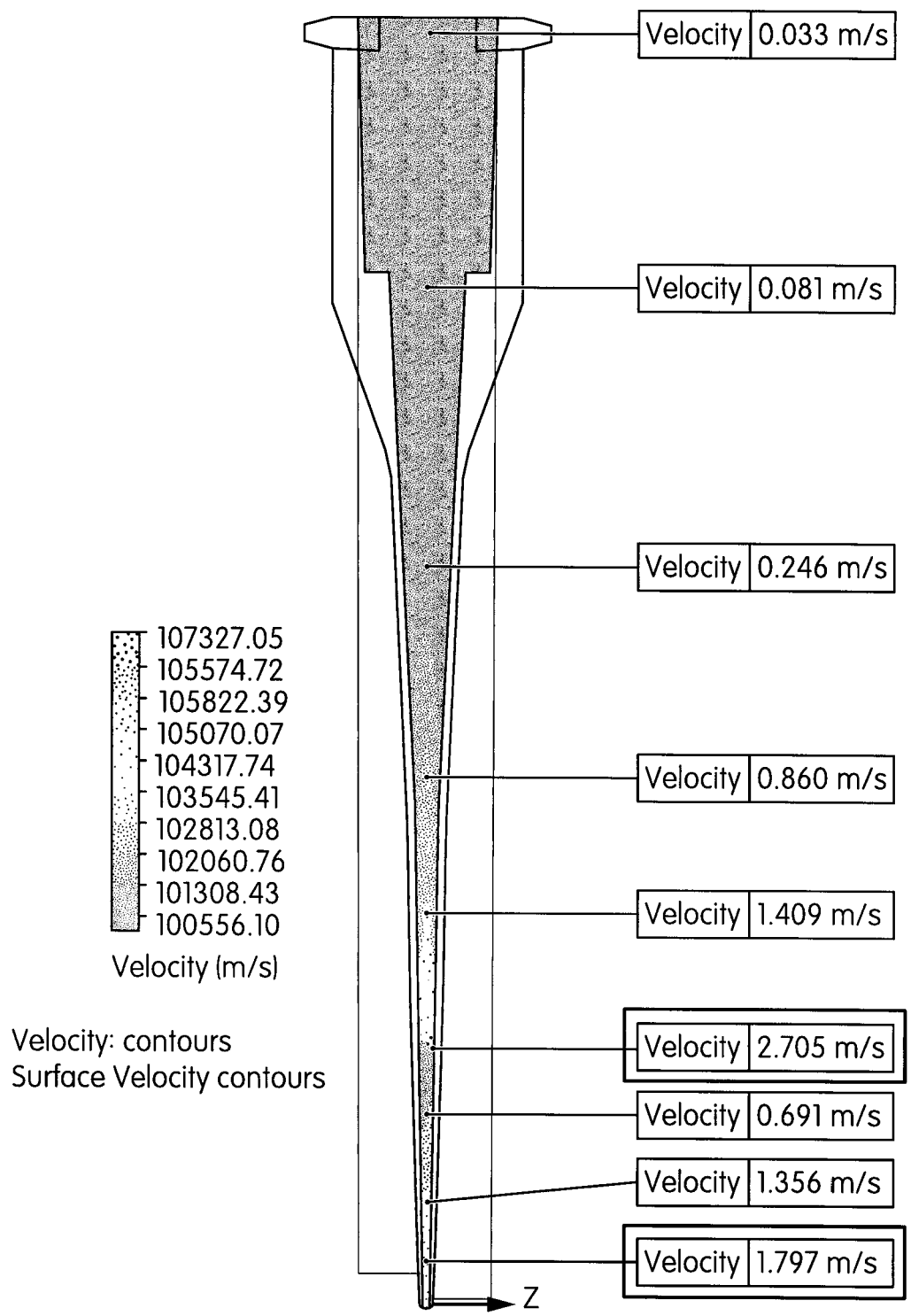
FIG. 15 shows a cross-sectional view of a prior art device with an internal fluid velocity distribution of a non-optimized port size.
Figure 16:
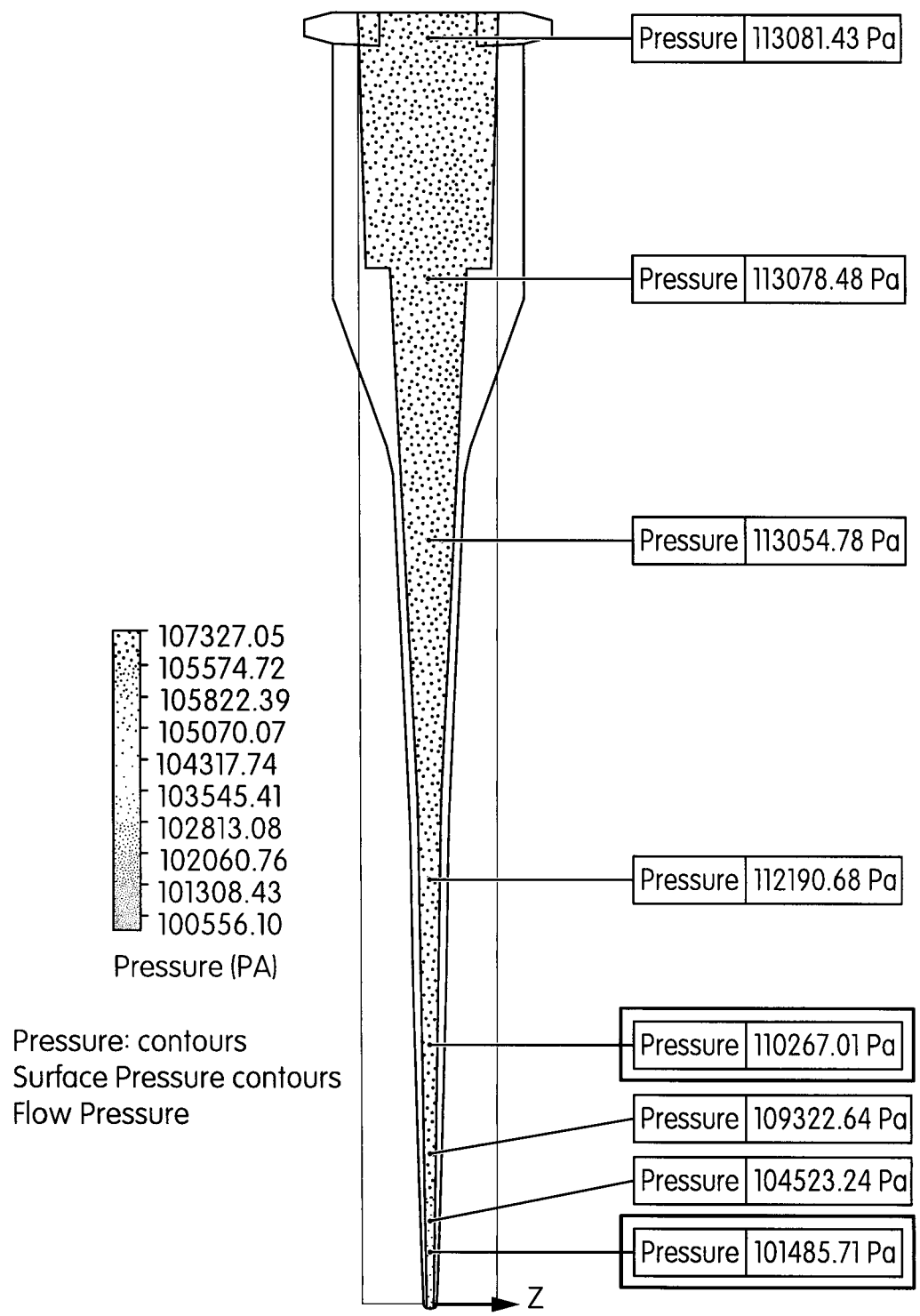
FIG. 16 shows a cross-sectional view of a prior art device with an internal fluid pressure distribution of an optimized port size.
Figure 17:
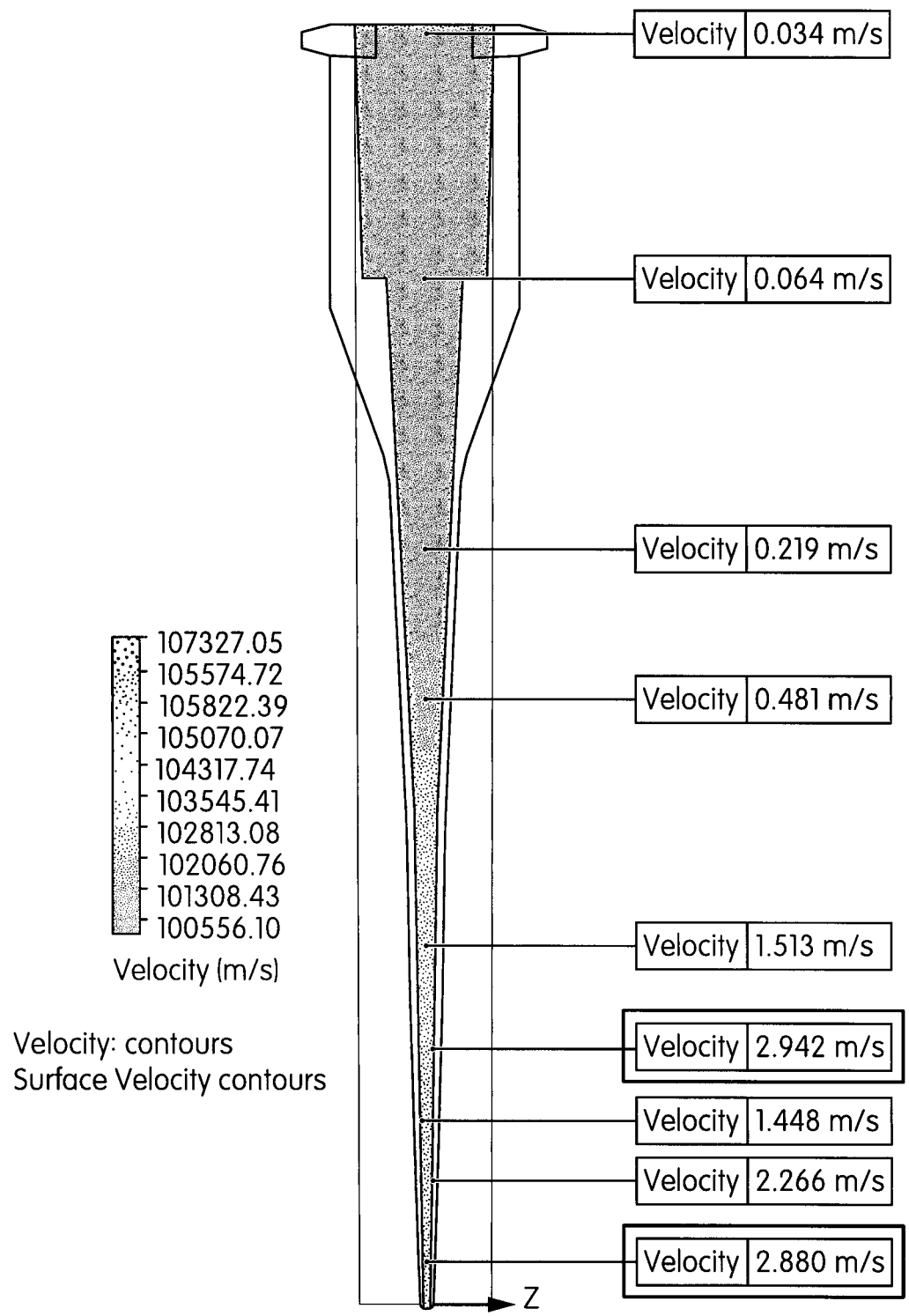
FIG. 17 shows a cross-sectional view of a prior art device with an internal fluid pressure distribution of an optimized port size.
Figure 18:
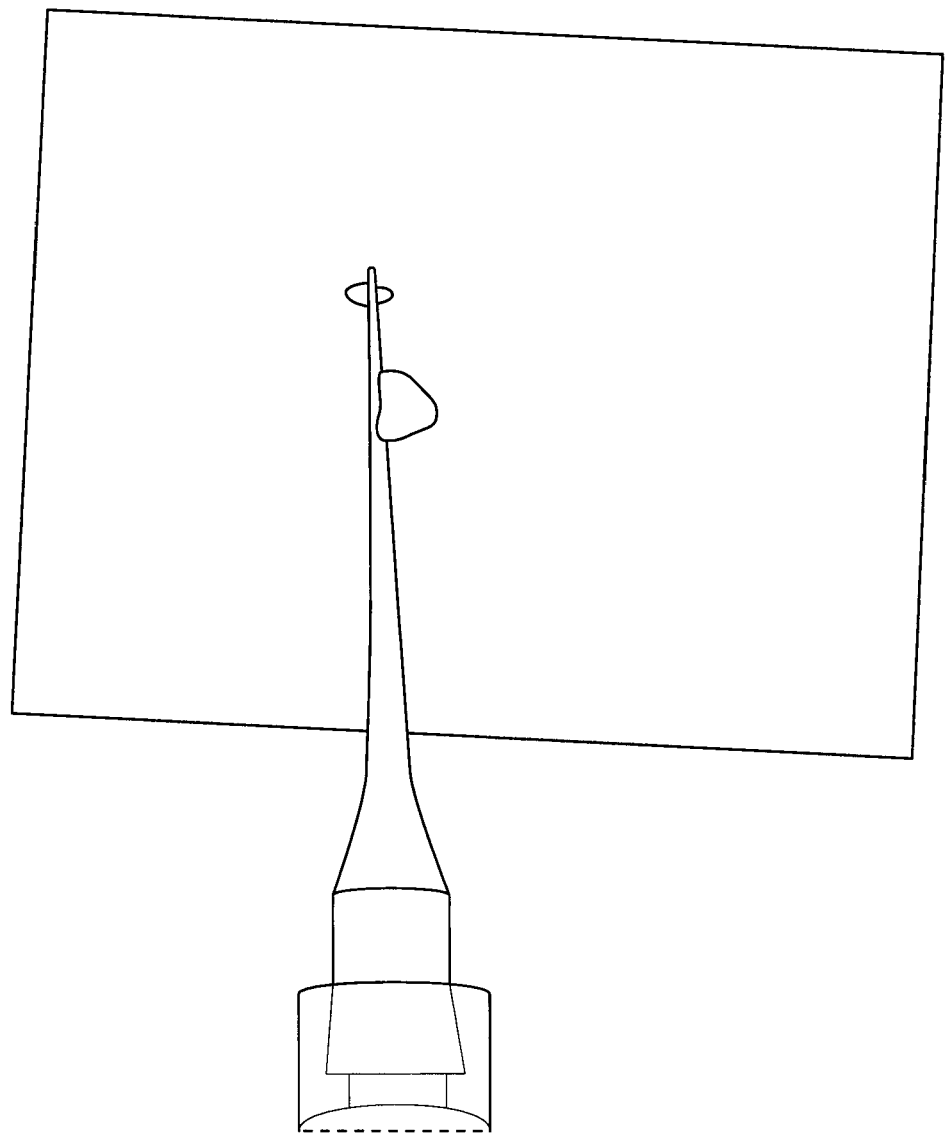
FIG. 18 shows an example of a sealer in a needle.

Needle Design Where Port Sizes are Not Optimized
(A) As shown in FIG. 14:
(B) As shown in FIG. 15:
Needle Design Where Port Sizes are Optimized
(A) As shown in FIG. 16:
(B) As shown in FIG. 17:
Sealer in needle as shown in FIG. 18:
The following compares the cleaning of a Traditional Irrigation Needle to the New Irrigation Needle Design in a simulated plastic canal filled with silicone gel irrigated with Isopropyl Alcohol at 21 ml/min for 1 minute:
Traditional Irrigation Needle New Irrigation Needle
As shown in FIG. 19A: As shown in FIG. 19B:

What is claimed is:

1. A dental irrigation needle for irrigating a shaped root canal comprising:
   a connection adapted to engage a syringe;
   an internal fluid delivery conduit configured to contain an irrigation fluid, the internal fluid delivery conduit including a tapered portion; and
   a plurality of exit ports for spouting irrigation fluid from the internal fluid delivery conduit,
   wherein the plurality of exit ports includes at least a coronal/mid root exit port located near a mid-portion of the tapered portion having a first size opening and an apical exit port located near a distal end portion of the tapered portion having a second size opening different than the first size opening, wherein an irrigation fluid velocity at the coronal/mid root exit port and at the apical exit port is proportional to a cross section area of the internal fluid delivery conduit at the apical exit port and the cross section area of an opening of the apical exit port multiplied by the irrigation fluid velocity at a cross section area of the internal fluid delivery conduit at the apical exit port;
   wherein the first size opening is smaller than the second size opening;
   and wherein at least one of the plurality of exit ports is configured such that when the irrigation flow rate is about 15 milliliters per minute, (i) the pressure and velocity of the irrigation fluid at the coronal/mid root port are about 110 kPa and 2.94 m/s respectively and (ii) the pressure and velocity of the irrigation fluid exiting the apical exit port are about 100 kPa and 2.88 m/s respectively.

2. The dental irrigation needle of claim 1, wherein the tapered portion of the internal fluid delivery conduit is between 0%-10% of the conduit.

3. The dental irrigation needle of claim 1, wherein during irrigation of the shaped root canal at least one of the plurality of exit ports is configured such that the irrigation fluid is spouted down an apical portion of the root canal.

4. The dental irrigation needle of claim 1, wherein at least one of the plurality of exit ports is configured such that that the irrigation fluid is spouted substantially perpendicularly to a longitudinal axis of the needle.

5. The dental irrigation needle of claim 1, wherein a shape of the plurality of exit ports is chosen from the group consisting of a circle, a rectangle, an ellipse and an oval.

6. The dental irrigation needle of claim 1, wherein the tapered portion is constructed such that walls of the tapered portion is similar to walls of a shaped root canal, and wherein the walls of the tapered portion at locations where there are no exit ports are recessed to allow for irrigation fluid to be removed easily from the shaped root canal due to a reduced volume of irrigation fluid in the internal fluid delivery conduit.

7. The dental irrigation needle of claim 1, wherein the plurality of exit ports is located at a plurality of angular positions around a longitudinal axis of the needle such that the walls or substantially all parts of the walls of the root canal are cleaned as the needle is moved up and down.

8. The dental irrigation needle of claim 7, wherein the plurality of exit portions are positioned along a path extending along the tapered portion and wherein adjacent exit ports of the plurality of exit ports are angularly displaced from each other along the longitudinal axis of the needle by an angle of between 45 and 180 degrees.

9. The dental irrigation needle of claim 1, wherein the apical exit port is elongated due to the tapered internal fluid conduit having a smaller volume at the distal end than at the mid-portion.

10. The dental irrigation needle of claim 1, wherein the coronal/mid root exit port is circular due to the tapered internal fluid conduit having a bigger volume at the mid-portion than at the distal end.

11. The dental irrigation needle of claim 1, wherein at least one of the plurality of exit ports is irregularly shaped.

12. The dental irrigation needle of claim 11, wherein the irregularly shaped exit port is elongated.

* * * * *